(12) United States Patent
Liu et al.

(10) Patent No.: US 11,713,361 B2
(45) Date of Patent: Aug. 1, 2023

(54) HYDROGENATION CATALYST COMPOSITIONS AND THEIR USE FOR HYDROGENATION OF NITRILE RUBBER

(71) Applicant: ARLANXEO DEUTSCHLAND GMBH, Cologne (DE)

(72) Inventors: Qingchun Liu, Shanghai (CN); Zhenli Wei, Shanghai (CN); Nian Gao, Beijing (CN)

(73) Assignee: ARLANXEO DEUTSCHLAND GMBH, Cologne (DE)

(*) Notice: Subject to any disclaimer, the term of this patent is extended or adjusted under 35 U.S.C. 154(b) by 350 days.

(21) Appl. No.: 17/048,370

(22) PCT Filed: Apr. 11, 2019

(86) PCT No.: PCT/EP2019/059228
§ 371 (c)(1),
(2) Date: Oct. 16, 2020

(87) PCT Pub. No.: WO2019/201730
PCT Pub. Date: Oct. 24, 2019

(65) Prior Publication Data
US 2021/0198385 A1   Jul. 1, 2021

(30) Foreign Application Priority Data

Apr. 20, 2018  (WO) ............... PCT/CN2018/083913

(51) Int. Cl.
*C08C 19/02* (2006.01)
*B01J 31/02* (2006.01)
*B01J 31/22* (2006.01)
*C08L 15/00* (2006.01)

(52) U.S. Cl.
CPC .......... *C08C 19/02* (2013.01); *B01J 31/0204* (2013.01); *B01J 31/2217* (2013.01); *B01J 31/2273* (2013.01); *B01J 31/2295* (2013.01); *C08L 15/005* (2013.01); *B01J 2231/643* (2013.01); *B01J 2531/007* (2013.01); *B01J 2531/821* (2013.01)

(58) Field of Classification Search
CPC .. C08C 19/02; C08C 2019/09; B01J 31/0204; B01J 31/2217; B01J 31/2273; B01J 31/2295; B01J 2231/643; B01J 2531/007; B01J 2231/543; B01J 2231/645; B01J 31/0218; B01J 31/0222; B01J 31/0258; B01J 31/0267; B01J 31/2243; B01J 31/2278; B01J 31/0237; B01J 2531/821; C08L 15/005
See application file for complete search history.

(56) References Cited

U.S. PATENT DOCUMENTS

| 2014/0249277 A1 | 9/2014 | Liu et al. | |
| 2015/0025199 A1* | 1/2015 | Obrecht | B01J 31/2273 502/155 |
| 2016/0122376 A1* | 5/2016 | Wei | C08L 15/005 548/103 |

FOREIGN PATENT DOCUMENTS

| CA | 2329844 A1 | 6/2002 |
| CN | 101463103 A | 6/2009 |
| CN | 103224591 A | 7/2013 |
| CN | 102974772 A | 8/2014 |
| CN | 104024279 A | 9/2014 |
| CN | 2013057295 A | 9/2014 |
| EP | 1329455 A1 | 7/2003 |
| EP | 2484700 A1 | 8/2012 |
| WO | 03062253 A1 | 7/2003 |
| WO | 2013056461 A1 | 4/2013 |
| WO | 2013057295 A2 | 4/2013 |
| WO | 2014198658 A1 | 12/2014 |

OTHER PUBLICATIONS

International Search Report and Written Opinion of the International Searching Authority for corresponding application PCT/EP2019/059228 dated Oct. 10, 2019.
International Search Report and Written Opinion of the International Searching Authority for related application PCT/CN2018/083913 dated Jan. 24, 2019.
Stijn Monsaert et al: "A highly controllable latent Ruthenium Schiff base olefin metathesis catalyst: catalyst activation and mechanistic studies", Journal of Polymer Science, Part A: Polymer Chemistry, John Wiley & Sons, Inc, US, vol. 48, No. 2, Jan. 15, 2010, pp. 302-3010.
Jennifer Julis et al: "Selective ethenolysis and oestrogenicity of compounds from cashew nut shell liquid", Green Chemistry, vol. 16, No. 5, Jan. 1, 2014, pp. 2846-2856, XP055428440, GB.
Charles E. Diesendruck et al: "The Versatile Alkylidene Moiety in Ruthenium Olefin Metathesis Catalysts", European Journal of Inorganic Chemistry, vol. 2009, No. 28, Aug. 28, 2009, pp. 4185-4203, XP055068279.
Louie J et al: "Metathesis of Electron-Rich Olefins: Structure and Reactivity of Electron-Rich Carbene Complexes", Organometallics, American Chemical Society, US, vol. 21, No. 11, May 27, 2002, pp. 2153-2164, XP001103815, ISSN: 0276-7333, DOI: 10.1021/0M011037A.
M. Sanford, et al.: Mechanism and activity of Ruthenium Olefin Metathesis catalysts, Journal of American Chem Soc., 2001, 123, pp. 6543-6554.

(Continued)

*Primary Examiner* — Robert C Boyle
(74) *Attorney, Agent, or Firm* — Norris McLaughlin PA

(57) ABSTRACT

This invention relates to novel hydrogenation catalyst compositions obtainable from reacting metal-based complex hydrogenation catalysts with specific co-catalysts and to a process for selectively hydrogenating nitrile rubbers in the presence of such novel hydrogenation catalyst compositions.

18 Claims, 1 Drawing Sheet

(56) References Cited

OTHER PUBLICATIONS

P. Martin, et al.: "A detailed study of the Hydrogenation of nitrile-butadiene rubber and other substrates catalyzed by RU(II) Complexes", Journal of Molecular Catalysis, 1997, 126, pp. 115-131.
S. Drouin, et al.: "Organometallics", AMerican Chemical Society, 2001, vol. 20, No. 26, pp. 5495-5497.

* cited by examiner

Figure 1: Hydrogenation degree of the (H)NBR samples before during the hydrogenation process in Example 1, 2 and 5.

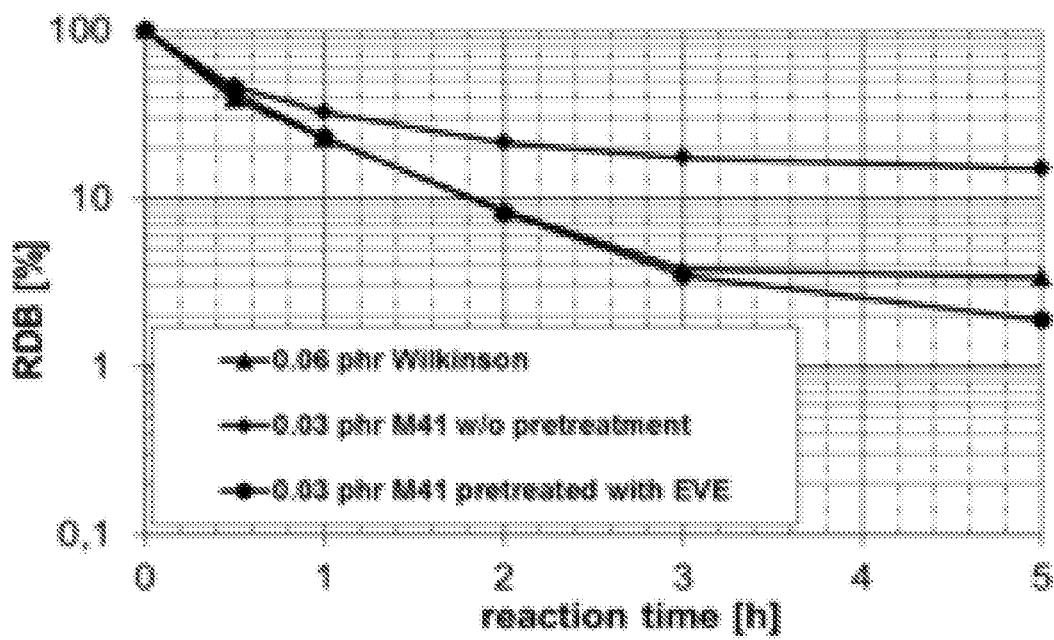

Figure 1 shows that the pretreatment of M41 catalyst with EVE increases the hydrogenation activity compared to the untreated M41 catalyst. The EVE-pretreated M41 catalyst shows the same and even better hydrogenation activity as the state of the art Rhodium-based Wilkinson catalyst.

HYDROGENATION CATALYST COMPOSITIONS AND THEIR USE FOR HYDROGENATION OF NITRILE RUBBER

This is an application filed under 35 USC 371 based on PCT/EP2019/059228 filed 11 Apr. 2019, which in turn is based on PCT/CN2018/083913 filed 20 Apr. 2018. The present application claims the full priority benefit of these prior applications and herein incorporates by reference the full disclosures of these prior applications.

FIELD OF THE INVENTION

This invention relates to novel hydrogenation catalyst compositions obtainable from reacting metal-based complex hydrogenation catalysts with specific co-catalysts and to a process for selectively hydrogenating nitrile rubbers in the presence of such novel hydrogenation catalyst compositions.

BACKGROUND OF THE INVENTION

The term "acrylonitrile-butadiene rubber" or "nitrile rubber", also named as "NBR" for short, shall be interpreted broadly and refers to rubbers which are copolymers or terpolymers of at least one $\alpha,\beta$-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

HNBR is a specialty rubber which has very good heat resistance, an excellent resistance to ozone and chemicals and also an excellent oil resistance. The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil exploration and also for numerous parts in the aircraft industry, the electronics industry, mechanical engineering and shipbuilding. A hydrogenation conversion higher than 95%, or a residual double bond (RDB) content<5%, without cross-linking during the hydrogenation reaction and a gel level of less than about 2.5% in the resultant HNBR is a threshold that ensures high-performance applications of HNBR in these areas and guarantees excellent processability of the final product.

The degree of hydrogenation of the copolymerized diene units in HNBR may vary in the range from 50 to 100%, however, the desired hydrogenation degree is from about 80 to about 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637). Suitable catalysts and solvents for a hydrogenation in the homogeneous phase are known.

Also for commercial purposes the production of HNBR by hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as osmium and ruthenium.

Ru-based complexes are also good catalysts for polymer solution hydrogenation, and the price for Ru metal is even cheaper. Ru—PPh$_3$ complexes and RuHCl(CO)L$_2$ (L is a bulky phosphine) catalyst systems lead to quantitative hydrogenation of NBR as disclosed in Journal of Molecular Catalysis A: Chemical, 1997, 126(2-3), 115-131). During such hydrogenation it is not necessary to add a free phosphine ligand to maintain the catalyst activity. However, they are prone to gel formation and may cause a certain degree of cross-linking during hydrogenation.

However, these above mentioned Ru or Os catalysts are active catalysts for hydrogenation only, not for metathesis reactions. Therefore, these types of Ru or Os catalysts cannot be used for NBR metathesis/degradation to produce NBR with reduced molecular weight.

Another problem of the HNBR production is that HNBR with a low Mooney viscosity is difficult to manufacture by the direct hydrogenation of commercially available NBR. The relatively high Mooney viscosity places restrictions on the processability of HNBR. Many applications would ideally use HNBR grades with a lower molecular weight and a lower Mooney viscosity. This would give a decisive improvement in processability.

For a long time, it has not been possible to produce HNBR on a large scale having a low molar mass corresponding to a Mooney viscosity (ML1+4 at 100° C.) in the range below 55 or with a weight average molecular weight of about Mw<200,000 g/mol by means of the established direct NBR hydrogenation processes mainly for two reasons: Firstly a sharp increase in the Mooney viscosity occurs during hydrogenation of NBR which means that a HNBR polymer with substantially increased Mooney viscosity is obtained. The Mooney Increase Ratio (MIR) is generally around 2 or even above, depending upon the NBR grade, hydrogenation level and nature of the NBR feedstock. Thus, the Mooney viscosity range of marketed HNBR is limited by the lower limit of the Mooney viscosity of the NBR starting material. Secondly, the molar mass of the NBR feedstock to be used for the hydrogenation cannot be reduced at will since otherwise work-up in the NBR industrial plants available is no longer possible because the rubber becomes too sticky. The lowest Mooney viscosity of an NBR feedstock which can be worked up without difficulties in an established industrial plant is in a range of about 30 Mooney units (ML1+4 at 100° C.). The Mooney viscosity of the hydrogenated nitrile rubber obtained using such an NBR feedstock is in the order of 55 Mooney units (ML1+4 at 100° C.). The Mooney viscosity is determined in accordance with ASTM standard D 1646.

In the more recent prior art, this problem is solved by reducing the molecular weight of the nitrile rubber before hydrogenation by degradation to a Mooney viscosity (ML1+4 at 100° C.) of less than 30 Mooney units or a weight average molecular weight of Mw<200,000 g/mol. The reduction in the molecular weight is achieved by metathesis of the NBR in the presence of metathesis catalysts. WO-A-

02/100905 and WO-A-02/100941 describe for example a process which comprises degradation of nitrile rubber starting polymers by olefin metathesis and subsequent hydrogenation. A nitrile rubber is reacted in a first step in the presence of a coolefine and a specific catalyst based on osmium, ruthenium, molybdenum or tungsten complexes and hydrogenated in a second step. The hydrogenated nitrile rubbers obtained may have a weight average molecular weight (Mw) in the range from 30,000 to 250,000 g/mol, a Mooney viscosity (ML 1+4 at 100° C.) in the range from 3 to 50 MU and a polydispersity index PDI of less than 2.5. The metathesis reaction is advantageously carried out in the same solvent as the subsequent hydrogenation so that the degraded nitrile rubber does not have to be necessarily isolated from the solvent after the degradation reaction is complete. Well-known for metathesis of nitrile rubber are a number of Ru-based metathesis catalysts like e.g. Grubbs I (benzylidene bis(tricyclohexylphosphine) dichloro ruthenium), Grubbs II (benzylidene [1,3-bis(2,4,6-trimethylphenyl)-2-imidazolidinyliden]tricyclohexylphosphin dichloro ruthenium), Grubbs III (benzylidene [1,3-bis(2,4,6-trimethylphenyl)-2-imidazolidin-ylidene]dichloro-bis(3-bromopyridine)ruthenium), Hoveyda-Grubbs II ([1,3-bis-(2,4,6-trimethylphenyl)-2-imidazolidinyliden]dichloro(o-isopropoxyphenylmethylen) ruthenium) (see e.g. US-A-2008/0064882) and a number of fluorenyliden-based complex catalysts (see e.g. US-A-2009/0076226)

In further references the quenching of metathesis reactions with vinyl compounds is described: Numerous patent applications, e.g. EP2670782 and EP2603533 are referring to the molecular weight degradation of nitrile rubbers by a methathesis reaction and contain experiments in which the reaction mixture is treated with ethylvinylether after the metathesis reaction in order to destroy the metathesis catalyst. The molar ratio of ethylvinylether to the metathesis catalysts used is very high in order to efficiently stop the metathesis reaction by deactivation of the catalyst. In the aforementioned applications such molar ratio lies in a range of from 567:1 to more than 17,000:1. None of those patent applications provides any disclosure or hint that by choosing lower ratios of the deactivating reagent to the metathesis catalyst a catalyst composition is obtained which is excellently suited for a selective hydrogenation, i.e. without continuing to catalyse the metathetic degradation.

In J. Am. Chem. Soc. 2001, 123, 6543-54 the mechanism of ruthenium based catalysts for olefin metathesis is disclosed. Further on it is described that the reaction of ruthenium carbenes with ethylvinylether can be utilized as a method for quenching ring opening metathesis polymerization. As shown in the following scheme a so-called Fischer-carbene complex is reported to be built.

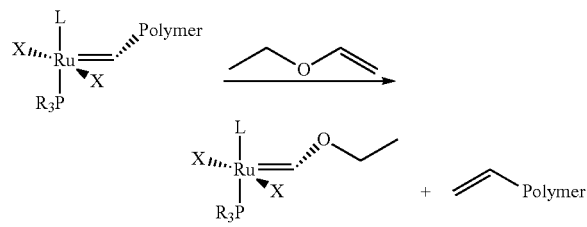

Thus, the catalytic activity of the catalyst is stopped with ethylvinylether. The molar ratio of the complex catalyst to the cocatalyst was 1:(15-60).

It has been known that some ruthenium-based metathesis catalysts can be used also for the hydrogenation of unsaturated substrates (Organometallic, 2001, 20(26), 5495-5497).

However, when NBR is hydrogenated using these types of catalysts, the molecular weight of the final HNBR is dramatically reduced due to severe chain degradation of polybutadiene units. Thus, after this process only HNBR with low molecular weight can be obtained. Meanwhile, in this process the hydrogenation rate is slow.

When ruthenium-based metathesis catalysts are directly used for NBR hydrogenation, normally only HNBR with low molecular weight can be obtained due to the metathesis activity of the catalysts. To obtain HNBR with high molecular weight, it is desirable to explore a way to suppress or stop the metathesis activity of catalysts and improve their hydrogenation activity. Ethyl-vinyl-ether (EVE) is well-known metathesis stopping agent. The hydrogenation after the metathesis stopping step was realized by the addition of extra hydrogenation catalysts (Pd-, Rh-, or Ru-based, e.g. U.S. Pat. No. 7,470,750).

WO-A-03/062253 discloses metal complexes which are useful as catalyst components in olefin metathesis reactions. However, the use of the complex catalysts for hydrogenation or the use of co-catalysts for the suppression of the metathesis reaction is not disclosed WO-A-13057289 and WO-A-13057295 disclose catalyst compositions based on Ruthenium- or Osmium-based complex catalysts such as Grubbs I, Grubbs II, Grubbs III, Hoveyda-Grubbs or Zhan-IB and specific co-catalysts such as ethylvinylether and a process for selectively hydrogenating nitrile rubbers in the presence of such catalyst compostions. The examples show that HNBR can be prepared by hydrogenation of NBR in the presence of a catalyst composition which is obtained by contacting a metathesis catalyst with a specific co-catalyst wherein such contacting or pretreatment of the catalyst with the co-catalyst is conducted either separately or following a metathesis reaction in-situ in the reaction mixture before the addition of hydrogen. The metathesis activity of the catalyst is controlled by contacting the catalyst with the co-catalyst and thereby preparing the catalyst composition according to the invention. Thus the molecular weight of the HNBR obtained by the hydrogenation using the catalyst composition according to the invention is comparable to the original NBR feedstock. However, it is unknown whether this concept is applicable for other complex catalysts with different ligand structures.

In typical commercial production processes, a separate hydrogenation catalyst is added into the reaction system for the NBR hydrogenation after the NBR metathesis step. In this way, HNBR with controlled molecular weight can be produced, but two catalysts (one for metathesis and one for hydrogenation) are required to achieve high reaction efficiency.

Accordingly, it was the object of the present invention to provide an improved hydrogenation catalyst composition allowing a selective hydrogenation of nitrile rubber at low catalyst concentrations and short hydrogenation times.

SUMMARY OF THE INVENTION

The present invention relates to novel hydrogenation catalyst compositions which are obtainable by contacting a complex hydrogenation catalyst with at least one co-catalyst in a molar ratio of the complex hydrogenation catalyst to the co-catalyst in a range of from 1:(20-550).

The invention further on relates to a process of hydrogenating a nitrile rubber comprising
a) preparing the hydrogenation catalyst composition according to the invention by contacting a complex hydrogenation catalyst with at least one co-catalyst in a molar ratio of the complex hydrogenation catalyst to the co-catalyst in the range of 1:(20-550) and thereafter
b) hydrogenating the nitrile rubber with hydrogen in the presence of the novel hydrogenation catalyst composition.

A specific embodiment of the present invention relates to an alternative process which comprises firstly subjecting a nitrile rubber to a molecular weight degradation in a metathesis reaction by contacting the nitrile rubber in the absence or presence of a co-olefin with a complex hydrogenation catalyst, then
a) preparing the hydrogenation catalyst composition according to the invention by contacting the complex hydrogenation catalyst which is present in the reaction mixture after the metathesis reaction with at least one co-catalyst in a molar ratio of the complex hydrogenation catalyst to the co-catalyst in the range of 1:(20-550) and thereafter
b) hydrogenating the nitrile rubber with hydrogen in the presence of the novel catalyst composition.

The process advantageously allows to perform a hydrogenation of nitrile rubber without a simultaneous metathetic degradation of the nitrile rubber, if a hydrogenation catalyst composition is used which has been obtained by treating the metathesis complex hydrogenation catalyst with a co-catalyst first. Hence, the present process allows a hydrogenation of nitrile rubbers in a controlled manner, i.e. under formation of hydrogenated nitrile rubber with a tailor made molecular weight in a commercially attractive fashion. It is possible to keep the molecular weight of the nitrile rubber constant during hydrogenation. In the alternative it is also possible to adjust and regulate the molecular weight of the nitrile rubber in a desired manner by controlling and choosing the molar ratio between the metathesis active complex hydrogenation catalyst and the co-catalyst when preparing the novel hydrogenation catalyst composition. In particular the present process allows in a specific embodiment to take advantage of using one and the same catalyst for a metathesis reaction in a first step, then adding the co-catalyst to the reaction mixture of the metathesis reaction, thereby preparing the novel hydrogenation catalyst composition and thereafter hydrogenating the metathesized nitrile rubber in a second step. The co-catalyst can be added at any degree of metathesis to the reaction mixture containing the metathesis complex hydrogenation catalyst and therefore allows to prepare tailor-made hydrogenated nitrile rubbers in a commercially attractive fashion. Additionally the hydrogenation process of the present invention allows to use the complex hydrogenation catalyst in a very low concentration, so that there is no need to remove or recycle the transition metal based catalyst after the hydrogenation.

The hydrogenation catalyst composition prepared and used according to the present invention is characterized by its high hydrogenation activity. High hydrogenation degrees may be achieved in short reaction times. In particular the hydrogenation activity of the hydrogenation catalyst composition is higher than the hydrogenation activity of the corresponding complex hydrogenation catalyst only used as such for NBR hydrogenation.

BRIEF DESCRIPTION OF THE FIGURES

The above and other aspects, features and advantages of the invention will become apparent from the following detailed description in conjunction with the accompanying drawings showing the following:

FIG. 1: Hydrogenation degree of the (H)NBR samples during the hydrogenation process in Example 1, 2 and 5.

DETAILED DESCRIPTION OF THE INVENTION

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of moities, parameters or explanations given above or below in general terms or in preferred ranges can be combined with one another in any way, i.e. including combinations of the respective ranges and preferred ranges.

Complex Hydrogenation Catalysts

The complex hydrogenation catalyst to be used in the complex composition and the hydrogenation process relates to a complex hydrogenation catalyst of the general formulae (IA) and (IB), wherein:

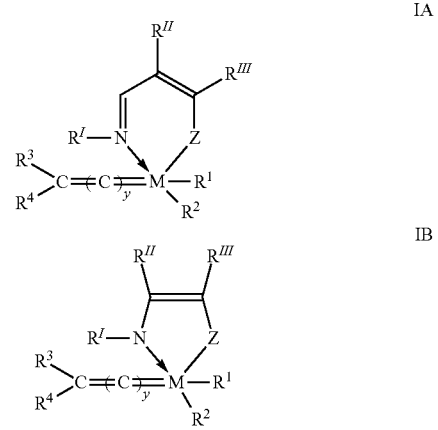

M is a metal selected from the group consisting of groups 4, 5, 6, 7, 8, 9, 10, 11 and 12 of the Periodic Table, preferably a metal selected from ruthenium, osmium, iron, molybdenum, tungsten, titanium, rhenium, copper, chromium, manganese, rhodium, vanadium, zinc, gold, silver, nickel and cobalt;

z is selected from the group consisting of oxygen, sulphur, selenium, NR'''', PR'''', AsR'''' and SbR''''; R'', R''' and R'''' are each a radical independently selected from the group consisting of hydrogen, $C_{1-6}$ alkyl, $C_{3-8}$ cycloalkyl, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, aryl and heteroaryl, or R'' and R''' together form an aryl or heteroaryl radical, each said radical (when different from hydrogen) being optionally substituted with one or more, preferably 1 to 3, substituents $R^5$ each independently selected from the group consisting of halogen atoms, $C_{1-6}$ alkyl, $C_{1-6}$ alkoxy, aryl, alkylsulfonate, arylsulfonate, alkylphosphonate, arylphosphonate, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, alkylammonium and arylammonium;

R' is either as defined for R'', R''' and R'''' when included in a compound having the general formula (IA) or, when included in a compound having the general formula (IB), is selected from the group consisting of $C_{1-6}$ alkylene and $C_{3-8}$ cycloalkylene, the said alkylene or cycloalkylene group being optionally substituted with one or more substituents $R^5$;

$R^1$ is an electron donating complex ligand, which could be linked or not linked with $R^2$ to form a cyclic structure;

$R^2$ is an anionic ligand;

$R^3$ and $R^4$ are each hydrogen or a radical selected from the group consisting of $C_{1-20}$ alkyl, $C_{2-20}$ alkenyl, $C_{2-20}$ alkynyl, $C_{1-20}$ carboxylate, $C_{1-20}$ alkoxy, $C_{2-20}$ alkenyloxy, $C_{2-20}$ alkynyloxy, aryl, aryloxy, $C_{1-20}$ alkoxycarbonyl, $C_{1-8}$ alkylthio, $C_{1-20}$ alkylsulfonyl, $C_{1-20}$ alkylsulfinyl $C_{1-20}$ alkylsulfonate, arylsulfonate, $C_{1-20}$ alkylphosphonate, arylphosphonate, $C_{1-20}$ alkylammonium and arylammonium;

R' and one of $R^3$ and $R^4$ may be bonded to each other to form a bidentate ligand;

R'' and R'''' may be bonded to each other to form an aliphatic ring system including a heteroatom selected from the group consisting of nitrogen, phosphorous, arsenic and antimony;

$R^3$ and $R^4$ together may form a fused aromatic ring system, and y represents the number of $sp_2$ carbon atoms between M and the carbon atom bearing $R^3$ and $R^4$ and is an integer from 0 to 3 inclusive, salts, solvates and enantiomers thereof.

The catalysts of the general formulae (IA) and (IB) are known in principle. Representatives of this class of compounds are e.g. the catalysts described in WO03/062253. These catalysts are either commercially available or can be prepared as described in the reference cited.

Definition of $R^1$:

In the general formulae (IA) and (IB), $R^1$ is an electron donating complex ligand, which could be linked or not linked with $R^2$ to form a cyclic structure. In one embodiment of the catalysts of general formulae (IA) and (IB) $R^1$ is a phosphine, sulfonated phosphine, phosphate, phosphinite, phosphonite, arsine, stibine, ether, amine, amide, sulfonate, sulfoxide, carboxyl, nitrosyl, pyridine, thioether, imidazoline or imidazolidine ligand (the latter two also being jointly referred to as "Im" ligand(s)).

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned by, for example, Grubbs in WO-A-03/011455. Examples are: pyridine, picolines (including α-, β- and γ-picoline), lutidines (including 2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If $R^1$ is an imidazoline or imidazolidine ligand (also jointly referred to as "Im" in this application unless indicated otherwise), this usually has a structure corresponding to the general formulae (IIa) or (IIb),

(IIa)

(IIb)

where $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, where these abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazoline and imidazolidine ligand depicted in the general formulae (IIa) and (IIb) in the present patent application are equivalent to the structures (IIa') and (IIb') which are frequently also found in the literature for this imidazoline and imidazolidine ligand, respectively, and emphasize the carbene character of the imidazoline and imidazolidine. This applies analogously to the associated preferred structures (IIIa)-(IIIu) depicted below.

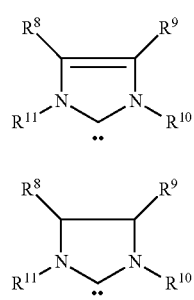

(IIa')

(IIb')

If R¹ is an imidazoline or imidazolidine ligand in the catalysts of the general formulae (IA) or (IB)
R⁸ and R⁹ are identical or different and preferably represent hydrogen, $C_6$-$C_{24}$-aryl, straight-chain or branched $C_1$-$C_{10}$-alkyl, or form a cycloalkyl or aryl structure together with the carbon atoms to which they are bound.
More preferably
R⁸ and R⁹ are identical and are selected from the group consisting of hydrogen, methyl, propyl, butyl and phenyl.

The preferred and more preferred meanings of R⁸ and R⁹ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

If R¹ is an imidazoline or imidazolidine ligand in the catalysts of the general formulae (IA) or (IB)
R¹⁰ and R¹¹ are identical or different and preferably represent straight-chain or branched $C_1$-$C_{10}$-alkyl, $C_3$-$C_{10}$-cycloalkyl, $C_6$-$C_{24}$-aryl, particularly preferably phenyl, $C_1$-$C_{10}$-alkylsulfonate, $C_6$-$C_{10}$-arylsulfonate.
More preferably
R¹⁰ and R¹¹ are identical and are selected from the group consisting of i-propyl, neopentyl, adamantyl, phenyl, 2,6-diisopropylphenyl, 2,6-dimethylphenyl, or 2,4,6-trimethylphenyl.

These preferred meanings of R¹⁰ and R¹¹ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

Particularly preferred imidazoline and imidazolidine ligands have the following structures (IIIa) to (IIIu), where "Ph" means in each case phenyl, "Bu" means butyl, "Mes" represents in each case 2,4,6-trimethylphenyl, "Dipp" means in all cases 2,6-diisopropylphenyl and "Dimp" means 2,6-dimethylphenyl.

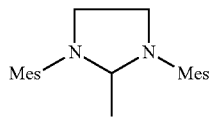

(IIIa)

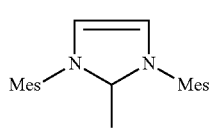

(IIIb)

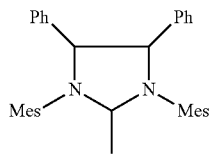

(IIIc)

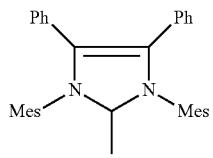

(IIId)

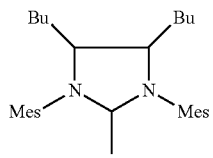

(IIIe)

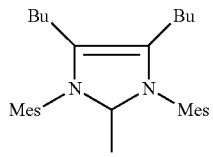

(IIIf)

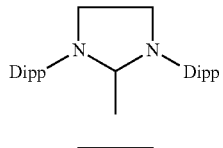

(IIIg)

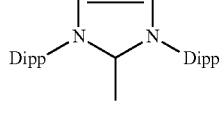

(IIIh)

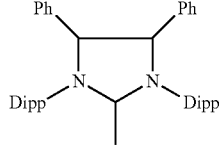

(IIIj)

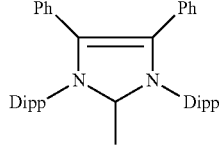

(IIIk)

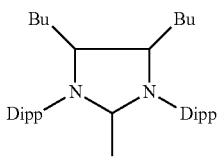
(IIIm)

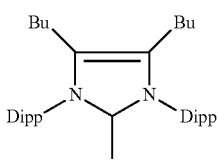
(IIIn)

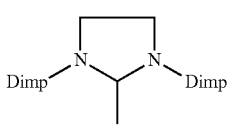
(IIIp)

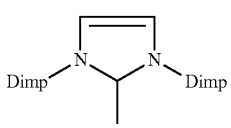
(IIIq)

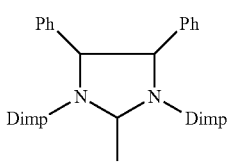
(IIIr)

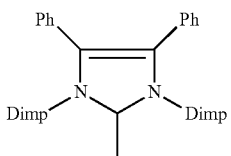
(IIIs)

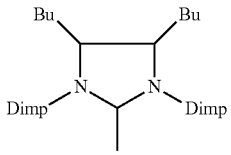
(IIIt)

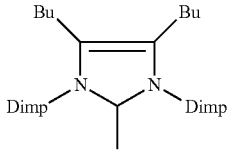
(IIIu)

In a further preferred embodiment $R^1$ may have the general formula (IIc) and (IId)

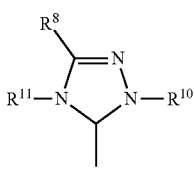
(IIc)

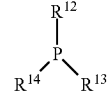 
(IId)

wherein $R^8$, $R^9$ and $R^{10}$ may have all general, preferred, more preferred and most preferred meanings as defined above in relation to general formulae (IIa) and (IIb), and $R^{12}$, $R^{13}$ and $R^{14}$ are identical or different and may represent alkyl, cycloalkyl, alkoxy, aryl, aryloxy, or a heterocyclic group.

In general formulae (IIc) and (IId) $R^8$, $R^9$, $R^{10}$, $R^{12}$, $R^{13}$ and $R^{14}$ may be substituted also by one or more further substituents selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a more preferred embodiment the ligand $R^1$ has the general formula (IId) wherein $R^{12}$, $R^{13}$ and $R^{14}$ are identical or different, even more preferably identical, and can represent $C_1$-$C_{20}$ alkyl, $C_3$-$C_8$-cycloalkyl, $C_1$-$C_{20}$ alkoxy, $C_6$-$C_{20}$ aryl, $C_6$-$C_{20}$ aryloxy, $C_2$-$C_{20}$ heteroaryl or a $C_2$-$C_{20}$ heterocyclic group;

In an even more preferred embodiment the ligand $R^1$ has the general formula (IId)

wherein $R^{12}$, $R^{13}$ and $R^{14}$ are identical and each selected from the group consisting of methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, neophenyl, cyclopropyl, cyclobutyl, cyclopentyl, cyclohexyl, cycloheptyl cyclooctyl, phenyl, biphenyl, naphthyl, phenanthrenyl, anthracenyl, tolyl, 2,6-dimethylphenyl, and trifluoromethyl.

In case the ligand $R^1$ possesses general formula (IId) it most preferably represents $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$.

Definition of $R^2$

In the catalysts of the general formulae (IA) or (IB), $R^2$ is an anionic ligand. The meaning of the term anionic ligand for the ligand $R^2$ is conventional in the art and preferably being consistent with the definition given in U.S. Pat. No. 5,977,393.

In one embodiment of the catalysts of general formulae (IA) or (IB), $R^2$ represents hydrogen, halogen, pseudohalogen, straight-chain or branched $C_1$-$C_3$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_2$-alkylthiol, $C_6$-$C_{24}$-arylthiol, $C_1$-$C_2$-alkylsulfonyl or $C_1$-$C_{20}$-alkylsulfinyl.

The abovementioned moieties listed as meanings for $R^2$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $R^2$ is halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulfonate.

In a particularly preferred embodiment, $R^2$ is halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate ($CH_3SO_3$) or trifluoromethanesulfonate ($CF_3SO_3$).

An alternative embodiment consists of each of $R^3$ and $R^4$ being a phenyl group.

In an alternative embodiment, $R^3$ and $R^4$ together form a fused aromatic ring system having the formula (VI)

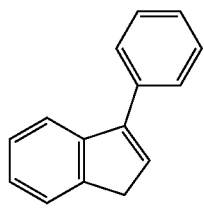

Preferably, the complex hydrogenation catalyst to be used in the complex composition and the hydrogenation process relates to a complex hydrogenation catalyst of the general formulae (IA) or (IB), wherein:

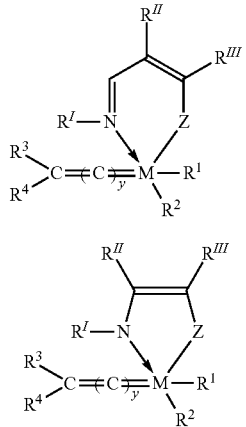

M is ruthenium or osmium, most preferably ruthenium;
z is selected from the group consisting of oxygen, sulphur, selenium, NR'''', PR'''', AsR'''' and SbR''''; R'', R' and R'' '' are each a radical independently selected from the group consisting of hydrogen, $C_{1-6}$ alkyl, $C_{3-8}$ cycloalkyl, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, aryl and heteroaryl, or R'' and R' together form an aryl or heteroaryl radical, each said radical (when different from hydrogen) being optionally substituted with one or more, preferably 1 to 3, substituents $R^5$ each independently selected from the group consisting of halogen atoms, $C_{1-6}$ alkyl, $C_{1-6}$ alkoxy, aryl, alkylsulfonate, arylsulfonate, alkylphosphonate, arylphosphonate, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, alkylammonium and arylammonium;

R' is either methyl, phenyl or substituted phenyl (e.g. dimethyl bromo phenyl or diisopropylphenyl) when included in a compound having the general formula (IA) or, is methylene or benzylidene when included in a compound having the general formula (IB);

$R^1$ is an electron donating complex ligand, which could be linked or not linked with $R^2$ to form a cyclic structure;

$R^2$ is an anionic ligand;

$R^3$ and $R^4$ are each hydrogen or a radical selected from the group consisting of $C_{1-20}$ alkyl, $C_{2-20}$ alkenyl, $C_{2-20}$ alkynyl, $C_{1-20}$ carboxylate, $C_{1-20}$ alkoxy, $C_{2-20}$ alkenyloxy, $C_{2-20}$ alkynyloxy, aryl, aryloxy, $C_{1-20}$ alkoxycarbonyl, $C_{1-8}$ alkylthio, $C_{1-20}$ alkylsulfonyl, $C_{1-20}$ alkylsulfinyl $C_{1-20}$ alkylsulfonate, arylsulfonate, $C_{1-20}$ alkylphosphonate, arylphosphonate, $C_{1-20}$ alkylammonium and arylammonium;

R' and one of $R^3$ and $R^4$ may be bonded to each other to form a bidentate ligand;

R'' and R'''' may be bonded to each other to form an aliphatic ring system including a heteroatom selected from the group consisting of nitrogen, phosphorous, arsenic and antimony;

$R^3$ and $R^4$ together may form a having the formula (VI)

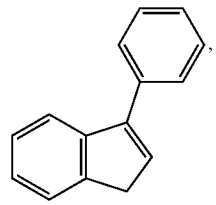

and
y represents the number of $sp_2$ carbon atoms between M and the carbon atom bearing $R^3$ and $R^4$ and is 0 or 1.

Most preferably, the complex hydrogenation catalyst of the hydrogenation catalyst composition is
i) [1,3-Bis(2,4,6-trimethylphenyl)-2-imidazolidinylidene]-[2-[[(4-methylphenyl)imino]methyl]-4-nitro-phenolyl]chloro-[3-phenyl-indenylidene]ruthenium (II) or
ii) [1,3-Bis(2,4,6-trimethylphenyl)-2-imidazolidinylidene]-[2-[[(2-methylphenyl)imino]methyl]-phenolyl]-[3-phenyl-1H-inden-1-ylidene](chloro)ruthenium(II).

Complex hydrogenation catalysts i) and ii) are commercially available at Umicore.

Co-Catalyst:
In a preferred embodiment the co-catalyst has the general formula (1)

$$CH_2=CRR' \quad (1)$$

in which R and R' are identical or different and shall mean hydrogen,
$OR^1$ wherein $R^1$ shall mean alkyl, cycloalkyl, alkenyl, alkynyl, aryl, or heteroaryl, $C(=O)(R^2)$, $—C(=O)N(R^2)_2$, $—[(CH_2)_n—X]_mR^2$, $—[(CH_2)_n—X]_m—CH=CH_2$, or $—(CH_2)_p—C(R^3)_2R^4$ wherein
X is identical or different and means oxygen (O) or $NR^2$
$R^2$ are identical or different and represent H, alkyl, cycloalkyl, alkenyl, alkynyl, aryl, or heteroaryl, R³ are identical or different and represent C₁-C₈ alkyl or
—(CH₂)ₙ—O—CH=CH₂, R⁴ represents (CH₂)ₚ—O—CH=CH₂, n is in the range of from 1 to 5, m is in the range of from 1 to 10, p is in the range of from 0 to 5, or where in the alternative, if R and R' both represent a group OR¹, both R¹ may be linked to each other and together represent a divalent group —(C(R²)₂)_q— with q being 2, 3 or 4 and R² being identical or different and having the above defined meanings, SR⁵, SOR⁵, SO₂R⁵ wherein R⁵ represents alkyl, cycloalkyl, alkenyl, alkynyl, aryl, or heteroaryl, N(R⁶R⁷), P(R⁶R⁷) wherein R⁶ and R⁷ are identical or different and shall mean alkyl, cycloalkyl, alkenyl, alkynyl, aryl, heteroaryl, —C(=O)(R²), or where in the alternative R⁶ and R⁷ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R⁸ or P—R⁸ wherein R⁸ shall mean alkyl, cycloalkyl, alkenyl, alkynyl, aryl, or heteroaryl, or P(=O)(OR⁹)₂ in which R⁹ are identical or different and shall mean alkyl, cycloalkyl, alkenyl, alkynyl, aryl, heteroaryl, however, under the proviso that R and R' must not both represent hydrogen at the same time.

In the co-catalysts according to general formula (1) all alkyl, cycloalkyl, alkenyl, alkynyl, aryl, or heteroaryl moieties in R¹, R², R³, R⁴, R⁵, R⁶, R⁷, R⁸ or R⁹ may optionally be further substituted by one or more alkyl, halogen, alkoxy, alkenyloxy, aryl or heteroaryl substituents. All aforementioned moities, in particular the alkyl, alkenyl and/or alkynyl moieties can be either straight chain or branched to the extent chemically plausible. Of course, the above proviso that the valency of the atom indicated is not exceeded and the substitution leads to a stable compound shall be fulfilled.

If R and R' represent OR¹, both such R¹ can be linked to each other and together represent a divalent group —(C(R²)₂)_q— with q being 2, 3, 4 or 5 and R² being identical or different and having the meanings defined regarding formula (1) above. In such case a cyclic structure is formed by the divalent group together with the two oxygen atoms to which it the divalent group is bound and the adjacent vinylic carbon atom.

In another embodiment of the present invention the hydrogenation catalyst composition is obtained using at least one, preferably one, co-catalyst having the general formula (1)

in which R is hydrogen and R' shall mean,

OR¹ wherein R¹ shall mean C₁-C₁₆-alkyl, C₃-C₁₀-cycloalkyl, C₂-C₁₆-alkenyl, C₂-C₂₀-alkynyl, C₆-C₂₄-aryl, C₆-C₂₄-heteroaryl, —C(=O)(R²), —C(=O)N(R²)₂, —[(CH₂)ₙX]ₘR², —[(CH₂)ₙX]ₘ—CH=CH₂, or —(CH₂)ₚ—C(R³)₂R⁴, wherein X is identical or different and oxygen (O) or NR², R² are identical or different and represent H, C₁-C₁₆-alkyl, C₃-C₁₀-cycloalkyl, C₂-C₁₆-alkenyl, C₂-C₂₀-alkynyl, C₆-C₂₄-aryl, or C₃-C₂₀-heteroaryl, R³ are identical or different and represent C₁-C₄ alkyl or —(CH₂)ₙ—O—CH=CH₂, R⁴ represents (CH₂)ₚ—O—CH=CH₂, n is in the range of from 1 to 4, m is in the range of from 1 to 5, p is in the range of from 0 to 5, SR⁵, SOR⁵, SO₂R⁵ wherein R⁵ represents C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, N(R⁶R⁷), P(R⁶R⁷) wherein R⁶ and R⁷ are identical or different and shall mean C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, —C(=O)(R²), or where in the alternative R⁶ and R⁷ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R⁸ or P—R⁸ wherein R⁸ shall mean C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, or P(=O)(OR⁹)₂ in which R⁹ are identical or different and shall mean C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl.

In another embodiment of the present invention the hydrogenation catalyst composition is obtained using at least one, preferably one, co-catalyst having the general formula (1)

in which R and R' are identical or different and shall mean OR¹ wherein R¹ shall mean C₁-C₁₆-alkyl, C₃-C₁₀-cycloalkyl, C₂-C₁₆-alkenyl, C₂-C₂₀-alkynyl, C₆-C₂₄-aryl, C₆-C₂₄-heteroaryl, —C(=O)(R²), —C(=O)N(R²)₂, —[(CH₂)ₙX]ₘR², —[(CH₂)ₙX]ₘ—CH=CH₂, or —(CH₂)ₚ—C(R³)₂R⁴ wherein

X is identical or different and oxygen (O) or NR²,

R² are identical or different and represent H, C₁-C₁₆-alkyl, C₃-C₁₀-cycloalkyl, C₂-C₁₆-alkenyl, C₂-C₂₀-alkynyl, C₆-C₂₄-aryl, or C₃-C₂₀-heteroaryl, R³ are identical or different and represent C₁-C₄ alkyl or —(CH₂)ₙ—O—CH=CH₂, R⁴ represents (CH₂)ₚ—O—CH=CH₂, n is in the range of from 1 to 4, m is in the range of from 1 to 5, p is in the range of from 0 to 5, or where in the alternative, if R and R' both represent a group OR¹, both R¹ may be linked to each other and together represent a divalent group —(C(R²)₂)_q— with q being 2, 3 or 4 and R² being identical or different and having the above defined meanings, SR⁵, SOR⁵, SO₂R⁵ wherein R⁵ represents C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, N(R⁶R⁷), P(R⁶R⁷) wherein R⁶ and R⁷ are identical or different and shall mean C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, —C(=O)(R²), or where in the alternative R⁶ and R⁷ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R⁸ or P—R⁸ wherein R⁸ shall mean C₁-C₁₆-alkyl, C₃-C₁₀-cycloalkyl, C₂-C₁₆-alkenyl, C₂-C₂₀-alkynyl, C₆-C₂₄-aryl, or C₆-C₂₄-heteroaryl, or P(=O)(OR$^9$)$_2$ in which R$^9$ are identical or different and shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl.

In another preferred embodiment of the present invention the hydrogenation catalyst composition is obtained using at least one, preferably one, co-catalyst having the above depicted general formula (1) wherein $$CH_2=CRR' \qquad (1)$$

in which R is hydrogen and R' shall mean
OR$^1$ wherein R$^1$ shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, C$_6$-C$_{14}$-heteroaryl, —C(=O)(R$^2$), —C(=O)N(R$^2$)$_2$, —[(CH$_2$)$_n$X]$_m$R$^2$, —[(CH$_2$)$_n$X]$_m$—CH=CH$_2$, or —(CH$_2$)$_p$—C(R$^3$)$_2$R$^4$ wherein
X is identical or different and oxygen (O) or NR$^2$,
R$^2$ are identical or different and represent H, C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
R$^3$ are identical or different and represent methyl, ethyl or —(CH$_2$)$_n$—O—CH=CH$_2$,
R$^4$ represents (CH$_2$)$_p$—O—CH=CH$_2$,
n is 1, 2 or 3
m is 1, 2, 3, or 4,
p is 0, 1, 2, 3 or 4,
SR$^5$, SOR$^5$, SO$_2$R$^5$ wherein R$^5$ represents C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
N(R$^6$R$^7$), P(R$^6$R$^7$)
wherein R$^6$ and R$^7$ are identical or different and shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_6$-C$_{14}$-heteroaryl, —C(=O)(R$^2$), or
where in the alternative R$^6$ and R$^7$ may form together with such N or P atom to which they both are linked at the same time a saturated, unsaturated or aromatic cyclic structure with 4 to 5 carbon atoms in the cyclic structure wherein one or two of said carbon atoms can be replaced by a moiety selected from oxygen, sulfur, nitrogen, N—R$^8$ or P—R$^8$ wherein R$^8$ shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
P(=O)(OR$^9$)$_2$ in which R$^9$ are identical or different and shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_6$-C$_{14}$-heteroaryl.

In another preferred embodiment of the present invention the hydrogenation catalyst composition is obtained using at least one, preferably one, co-catalyst having the above depicted general formula (1) wherein $$CH_2=CRR' \qquad (1)$$

in which R and R' are identical or different and shall mean OR$^1$ wherein R$^1$ shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, C$_6$-C$_{14}$-heteroaryl, —C(=O)(R$^2$), —C(=O)N(R$^2$)$_2$, —[(CH$_2$)$_n$X]$_m$R$^2$, —[(CH$_2$)$_n$X]$_m$—CH=CH$_2$, or —(CH$_2$)$_p$—C(R$^3$)$_2$R$^4$ wherein
X is identical or different and oxygen (O) or NR$^2$,
R$^2$ are identical or different and represent H, C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
R$^3$ are identical or different and represent methyl, ethyl or —(CH$_2$)$_n$—O—CH=CH$_2$,
R$^4$ represents (CH$_2$)$_p$—O—CH=CH$_2$,
n is 1, 2 or 3
m is 1, 2, 3, or 4,
p is 0, 1, 2, 3 or 4,
or where in the alternative, if R and R' both represent a group OR$^1$, both R$^1$ may be linked to each other and together represent a divalent group —(C(R$^2$)$_2$)$_q$— with q being 2, or 3 and R$^2$ being identical or different and representing hydrogen or C$_1$-C$_4$ alkyl,
SR$^5$, SOR$^5$, SO$_2$R$^5$ wherein R$^5$ represents C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
N(R$^6$R$^7$), P(R$^6$R$^7$) wherein R$^6$ and R$^7$ are identical or different and shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_6$-C$_{14}$-heteroaryl, —C(=O)(R$^2$), or
where in the alternative R$^6$ and R$^7$ may form together with such N or P atom to which they both are linked at the same time a saturated, unsaturated or aromatic cyclic structure with 4 to 5 carbon atoms in the cyclic structure wherein one or two of said carbon atoms can be replaced by a moiety selected from oxygen, sulfur, nitrogen, N—R$^8$ or P—R$^8$ wherein R$^8$ shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_3$-C$_{14}$-heteroaryl,
P(=O)(OR$^9$)$_2$ in which R$^9$ are identical or different and shall mean C$_1$-C$_{12}$-alkyl, C$_5$-C$_8$-cycloalkyl, C$_2$-C$_{12}$-alkenyl, C$_2$-C$_{12}$-alkynyl, C$_6$-C$_{14}$-aryl, or C$_6$-C$_{14}$-heteroaryl.

In another more preferred embodiment of the present invention the hydrogenation catalyst composition is obtained using one co-catalyst having the above depicted general formulae (1) wherein $$CH_2=CRR' \qquad (1)$$

in which R is hydrogen and R' represents
OR$^1$ wherein R$^1$ shall mean C$_1$-C$_6$-alkyl, C$_5$-C$_8$-cycloalkyl, C$_2$-C$_6$-alkenyl, C$_2$-C$_6$-alkynyl, phenyl, imidazolyl, triazolyl, or pyridinyl, —C(=O)(R$^2$), —C(=O)N(R$^2$)$_2$, —[(CH$_2$)$_n$O]$_m$R$^2$, —[(CH$_2$)$_n$O]$_m$—CH=CH$_2$, or —(CH$_2$)$_p$—C(R$^3$)$_2$R$^4$ wherein
R$^2$ are identical or different and represent H, C$_1$-C$_6$-alkyl, C$_5$-C$_8$-cycloalkyl, C$_2$-C$_8$-alkenyl, C$_2$-C$_8$-alkynyl, phenyl, imidazolyl, triazolyl, or pyridinyl,
R$^3$ are identical or different and represent methyl, ethyl or —(CH$_2$)$_n$—O—CH=CH$_2$,
R$^4$ represents (CH$_2$)$_p$—O—CH=CH$_2$,
n is 1, or 2,
m is 1, 2, or 3, and
p is 0, 1, or 3.

In all the above mentioned preferred, more preferred and most preferred embodiments of the co-catalysts according to general formula (1) the alkyl, cycloalkyl, alkenyl, alkynyl, aryl, or heteroaryl moieties in R$^1$, R$^2$, R$^3$, R$^4$, R$^5$, R$^6$, R$^7$, R$^8$ or R$^9$ may optionally be further substituted by one or more C$_1$-C$_6$-alkyl, C$_5$-C$_6$-cycloalkyl, C$_2$-C$_6$-alkenyl, C$_2$-C$_6$-alkynyl, phenyl, imidazolyl, triazolyl, or pyridinyl moieties. All aforementioned substituents, in particular the alkyl, alkenyl and/or alkynyl moieties can be either straight chain or branched to the extent chemically plausible.

In an even more preferred embodiment of the present invention one or more co-catalysts are used for the preparation of the novel hydrogenation catalyst compositions which have the following formulae:

(cocat-1) 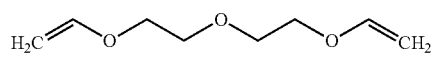
(cocat-2) 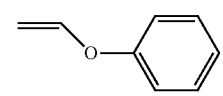
(cocat-3) 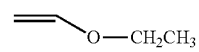
(cocat-4) 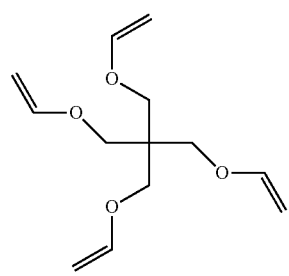
(cocat-5) 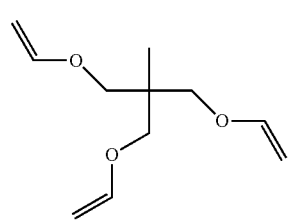
(cocat-6) 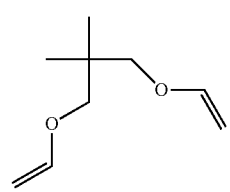
(cocat-7) 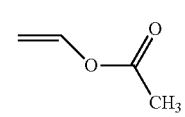
(cocat-8) 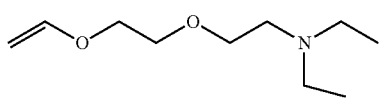
(cocat-9) 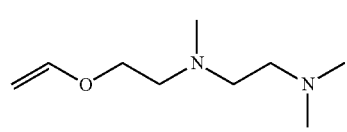
(cocat-10) 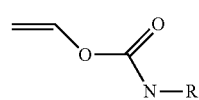
(cocat-11) 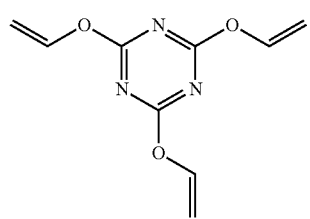
-continued
(cocat-12) 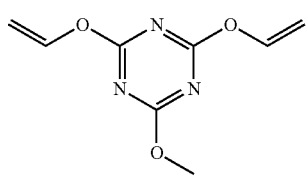
(cocat-13) 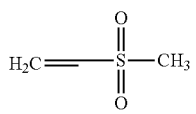
(cocat-14) 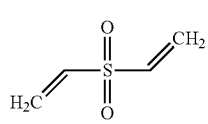
(cocat-15) 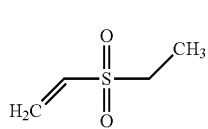
(cocat-16) 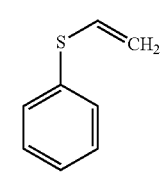
(cocat-17) 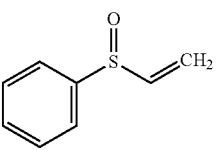
(cocat-18) 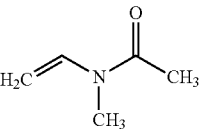
(cocat-19) 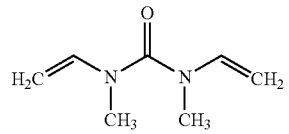
(cocat-20) 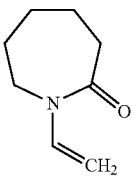
(cocat-21) 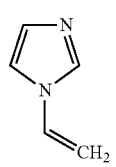

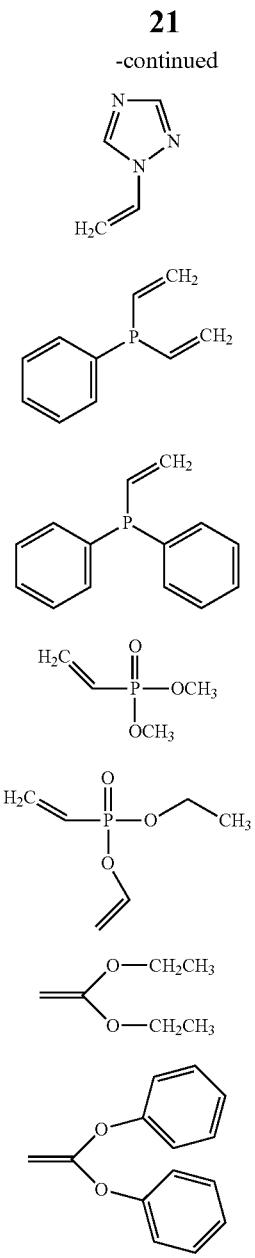
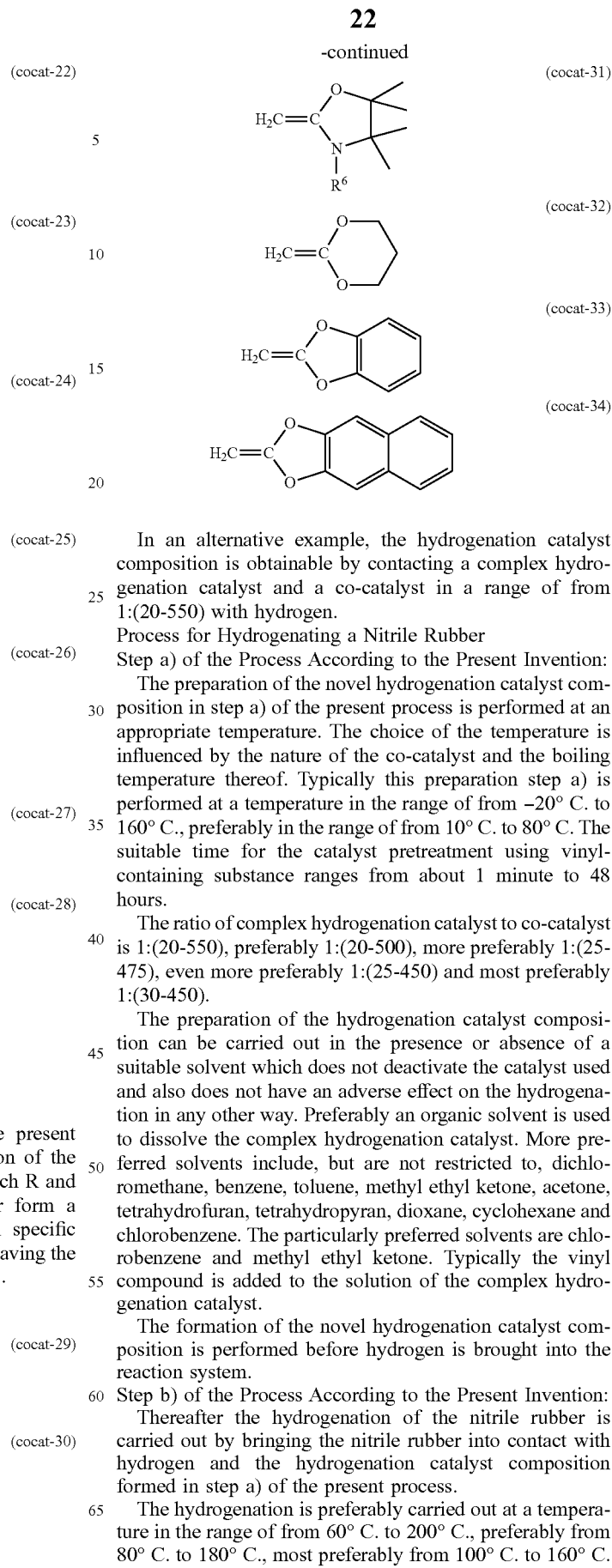

In another also preferred embodiment of the present invention a co-catalyst is used for the preparation of the novel hydrogenation catalyst compositions in which R and R' both represent OR' where such $R^1$ together form a divalent group as defined above, wherein such specific co-catalysts have the following formulae with $R^6$ having the same meaning as outlined for general formula (1).

In an alternative example, the hydrogenation catalyst composition is obtainable by contacting a complex hydrogenation catalyst and a co-catalyst in a range of from 1:(20-550) with hydrogen.

Process for Hydrogenating a Nitrile Rubber

Step a) of the Process According to the Present Invention:

The preparation of the novel hydrogenation catalyst composition in step a) of the present process is performed at an appropriate temperature. The choice of the temperature is influenced by the nature of the co-catalyst and the boiling temperature thereof. Typically this preparation step a) is performed at a temperature in the range of from −20° C. to 160° C., preferably in the range of from 10° C. to 80° C. The suitable time for the catalyst pretreatment using vinyl-containing substance ranges from about 1 minute to 48 hours.

The ratio of complex hydrogenation catalyst to co-catalyst is 1:(20-550), preferably 1:(20-500), more preferably 1:(25-475), even more preferably 1:(25-450) and most preferably 1:(30-450).

The preparation of the hydrogenation catalyst composition can be carried out in the presence or absence of a suitable solvent which does not deactivate the catalyst used and also does not have an adverse effect on the hydrogenation in any other way. Preferably an organic solvent is used to dissolve the complex hydrogenation catalyst. More preferred solvents include, but are not restricted to, dichloromethane, benzene, toluene, methyl ethyl ketone, acetone, tetrahydrofuran, tetrahydropyran, dioxane, cyclohexane and chlorobenzene. The particularly preferred solvents are chlorobenzene and methyl ethyl ketone. Typically the vinyl compound is added to the solution of the complex hydrogenation catalyst.

The formation of the novel hydrogenation catalyst composition is performed before hydrogen is brought into the reaction system.

Step b) of the Process According to the Present Invention:

Thereafter the hydrogenation of the nitrile rubber is carried out by bringing the nitrile rubber into contact with hydrogen and the hydrogenation catalyst composition formed in step a) of the present process.

The hydrogenation is preferably carried out at a temperature in the range of from 60° C. to 200° C., preferably from 80° C. to 180° C., most preferably from 100° C. to 160° C.

and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 12 hours, even more preferably from 1 hour to 8 hours and most preferably from 1 hour to 4 hours.

The amount of the hydrogenation catalyst composition which is present in the hydrogenation step b) based on the nitrile rubber can be chosen in a broad range, preferably so that from 1 to 1,000 ppm of ruthenium or osmium, preferably from 2 to 500 ppm, in particular from 5 to 250 ppm, are present based on the nitrile rubber used.

In an alternative embodiment of the present process it is possible to perform a metathesis reaction prior to the preparation of the novel hydrogenation catalyst composition and the subsequent hydrogenation. Such alternative process (hereinafter also referred to as "tandem process") comprises performing a metathesis step before the above described steps a) and b).

This means that such alternative process comprises firstly subjecting a nitrile rubber to a molecular weight degradation in a metathesis reaction comprising contacting the nitrile rubber in the absence or presence of a co-olefin with a complex hydrogenation catalyst based on ruthenium or osmium as central metal and bearing at least one ligand which is bound to the ruthenium or osmium central metal in a carbene-like fashion, then a) contacting the complex hydrogenation catalyst which is present in the reaction mixture obtained after the metathesis reaction with at least one co-catalyst having at least one vinyl group in a molar ratio of the complex hydrogenation catalyst to the co-catalyst in the range of 1: (20-550) to form a hydrogenation catalyst composition and thereafter b) hydrogenating the nitrile rubber with hydrogen in the presence of the hydrogenation catalyst composition.

Metathesis Step of the Tandem Method:

The NBR metathesis as first step of the tandem method can be carried out in the absence or presence of a co-olefin. This co-olefin is preferably a straight-chain or branched $C_2$-$C_{16}$-olefin. Suitable co-olefins are, for example, ethylene, propylene, isobutene, styrene, 1-hexene and 1-octene. Particular preference is given to using 1-hexene or 1-octene.

In the alternative the following functionalized co-olefins can be used:

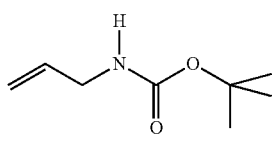
t-butyl-N-allylcarbamat

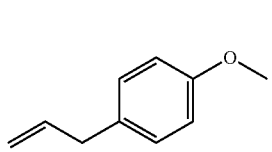
p-allylanisol

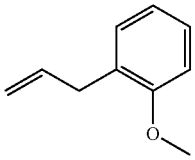
o-allylanisol

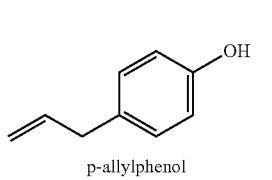
p-allylphenol

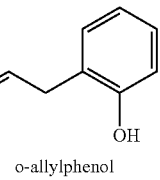
o-allylphenol

-continued

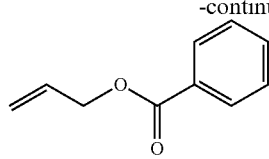
benzoic acid allylic ester

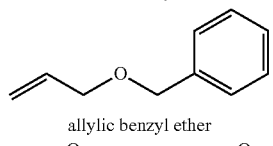
allylic benzyl ether

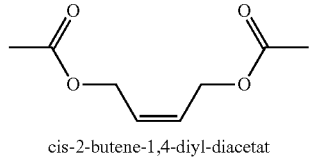
cis-2-butene-1,4-diyl-diacetat

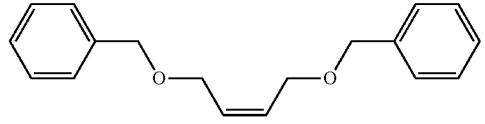
cis-1,4-bisbenzoyloxy-2-butene

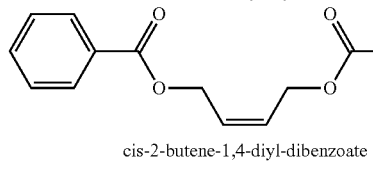
cis-2-butene-1,4-diyl-dibenzoate

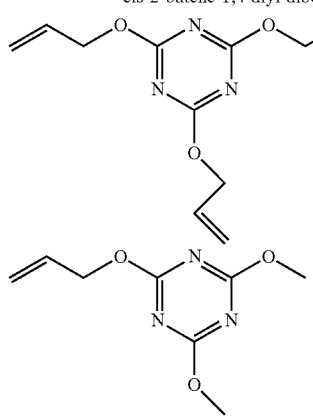

If the co-olefin is liquid, the amount of co-olefin is preferably in the range 0.2 to 20% by weight, based on the nitrile rubber used. If the co-olefin is a gas, as in the case of, for example, ethylene, the amount of co-olefin is selected so that a pressure in the range $1\times10^5$ Pa to $1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not have an adverse effect on the reaction in any other way. Preferred solvents include, but are not restricted to, dichloromethane, benzene, toluene, methyl ethyl ketone, acetone, tetrahydrofuran, tetrahydropyran, dioxane, cyclohexane and chlorobenzene. The particularly preferred solvent is chlorobenzene. In some cases when the co-olefin itself can function as solvent, e.g. in the case of 1-hexene, the addition of a further additional solvent can be dispensed with.

The amount of catalyst based on the nitrile rubber used in the metathesis step of the tandem method according to the invention depends on the nature and the catalytic activity of the specific complex hydrogenation catalyst. The amount of catalyst used is usually from 1 to 1,000 ppm of noble metal, preferably from 2 to 500 ppm, in particular from 5 to 250 ppm, based on the nitrile rubber used.

The concentration of the nitrile rubber used in the reaction mixture of the metathesis is not critical, but it should naturally be ensured that the reaction is not adversely affected by an excessively high viscosity of the reaction mixture and the associated mixing problems. The concentration of NBR in the reaction mixture is preferably in the range from 1 to 25% by weight, particularly preferably in the range from 5 to 20% by weight, based on the total reaction mixture.

The metathetic degradation is usually carried out at a temperature in the range from 10° C. to 150° C., preferably at a temperature in the range from 20° C. to 80° C.

The metathesis reaction time depends on a number of factors, for example on the type of NBR, the type of catalyst, the catalyst concentration and co-olefin concentration used and the reaction temperature. The progress of the cross-metathesis can be monitored by standard analytical methods, e.g. by GPC measurements or by determination of the viscosity. The reaction is typically allowed to be conducted for about 15 minutes to six hours under normal conditions. It is also possible to perform the metathesis reaction until the reaction ceases by deactivation of the catalyst.

After such metathesis step, the reaction mixture containing the metathesis catalyst is taken and brought into contact with the co-catalyst having the general formula (1) or (2). Typically the co-catalyst is simply added to the reaction mixture, preferably in the same solvent in which the metathesis was performed.

The appropriate temperature for the preparation of the novel hydrogenation catalyst composition after the metathesis in the tandem method can also be chosen in the range of from −20° C. to 160° C., preferably in the range of from 10° C. to 80° C. The suitable time for the preparation of the hydrogenation catalyst composition for the subsequent hydrogenation reaction in such tandem reaction using the vinyl-group containing co-catalyst ranges from about 5 minutes to 48 hours. The preferred time ranges from 10 minutes to 12 hours.

The subsequent hydrogenation of the nitrile rubber can be carried in the same manner as described above for the hydrogenation reaction.

One major advantage of the present invention resides in the fact that the hydrogenation catalyst composition used is very active, so that the catalyst residue in the final HNBR products can be low enough to make the catalyst metal removal or recycle step alleviated or even unnecessary. However, to the extent desired, the catalysts used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen and then be precipitated in cold methanol.

Nitrile Rubber:

The nitrile rubber used in the process of the present invention is a copolymer or terpolymer of at least one α,β-unsaturated nitrile, at least one conjugated diene and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl (meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth) acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_3$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analoguos diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

As further termonomers PEG acrylate monomers derived from PEG acrylates of the general formula (1)

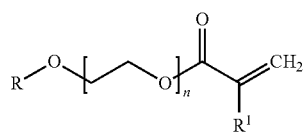

Formula (I)

where R is hydrogen or branched or unbranched $C_1$-$C_{20}$-alkyl, preferably methyl, ethyl, butyl or ethylhexyl, n is 1 to 8, preferably 2 to 8, more preferably 2 to 5 and most preferably 3 and $R^1$ is hydrogen or $CH_3$— may be used.

The term "(meth)acrylate" in the context of this invention represents "acrylate" and "methacrylate". When the $R^1$ radical in the general formula (I) is $CH_3$—, the molecule is a methacrylate. The term "polyethylene glycol" or the abbreviation "PEG" represents both monoethylene glycol sections having one repeat ethylene glycol unit (PEG-1; n=1) and polyethylene glycol sections having 2 to 8 repeat ethylene glycol units (PEG-2 to PEG-8; n=2 to 8). The term "PEG acrylate" is also abbreviated to PEG-X-(M)A where "X" represents the number of repeat ethylene glycol units, "MA" represents methacrylate and "A" represents acrylate. Acrylate monomers derived from PEG acrylates of the general formula (I) are referred to as "PEG acrylate monomers".

Preferred PEG acrylate monomers are selected from the following formulae no. 1 to no. 10, where n is 1, 2, 3, 4, 5, 6, 7 or 8, preferably 2, 3, 4, 5, 6, 7 or 8, more preferably 3, 4, 5, 6, 7 or 8 and most preferably 3:

| | |
|---|---|
| Polyethylene glycol acrylate (Formula no. 1) | 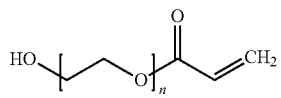 |
| Polyethylene glycol methacrylate (Formula no. 2) | 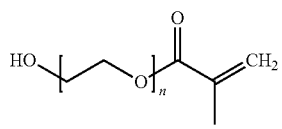 |
| Methoxy polyethylene glycol acrylate (Formula no. 3) | 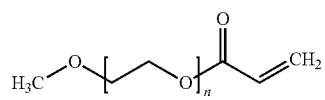 |
| Methoxy polyethylene glycol methacrylate (Formula no. 4) | 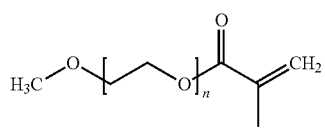 |
| Ethoxy polyethylene glycol acrylate (Formula no. 5) | 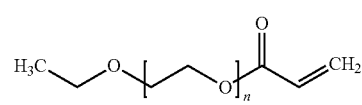 |
| Ethoxy polyethylene glycol methacrylate (Formula no. 6) | 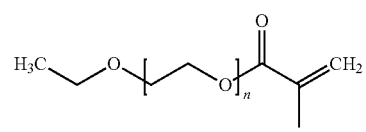 |
| Butoxy polyethylene glycol acrylate (Formula no. 7) | 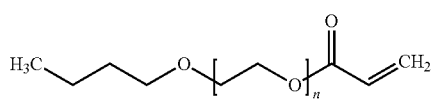 |
| Butoxy polyethylene glycol methacrylate (Formula no. 8) | 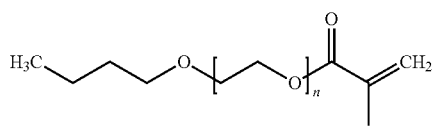 |
| Ethylhexoxy polyethylene glycol acrylate (Formula no. 9) | 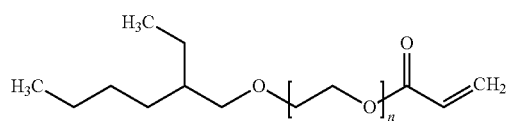 |
| Ethylhexoxy polyethylene glycol methacrylate (Formula no. 10) | 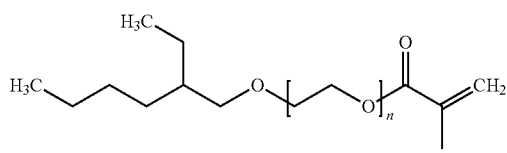 |

Other commonly used names for methoxy polyethylene glycol acrylate (formula no. 3) are, for example, poly(ethylene glycol) methyl ether acrylate, acrloyl-PEG, methoxy-PEG acrylate, methoxy poly(ethylene glycol) monoacrylate, poly(ethylene glycol) monomethyl ether monoacrylate or mPEG acrylate.

Particularly preferred are termonomers chosen from the below depicted formulae:

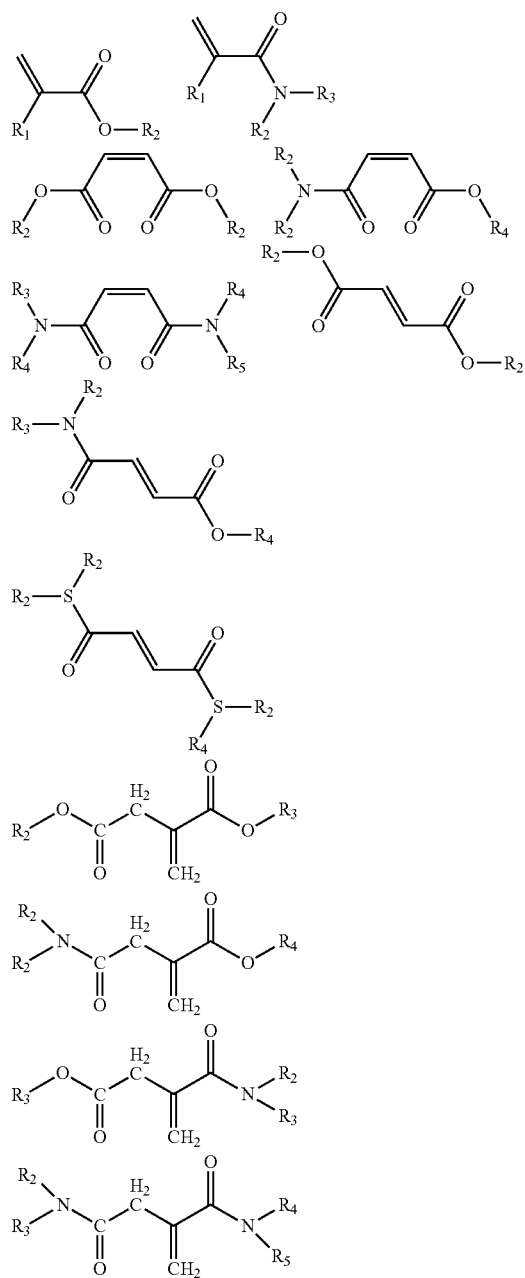

where
$R^1$ is hydrogen or methyl group, and
$R^2$, $R^3$, $R^4$, $R^5$ are identical or different and may represent H, $C_1$-$C_{12}$ alkyl, cycloalkyl, alkoxyalkyl, hydroxyalkyl, expoxyalkyl, aryl, heteroaryl.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α,β-unsaturated nitrile or the sum of α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrite rubbers by polymerization of the abovementioned monomers is adequately known to those skilled in the art and is comprehensively described in the literature. Nitrile rubbers which can be used for the purposes of the invention are also commercially available, e.g. as products from the product range of the Perbunan® and Krynac® grades of ARLANXEO Deutschland GmbH.

The nitrile rubbers to be hydrogenated have a Mooney viscosity (ML1+4 at 100° C.), measured in accordance with ASTM standard D 1646, in the range from 1 to 75, and preferably from 5 to 50. The weight average molecular weight Mw is in the range 2,000-500,000 g/mol, preferably in the range 20,000-400,000 g/mol. The nitrile rubbers have a polydispersity PDI=Mw/Mn, where Mw is the weight average molecular weight and Mn is the number average molecular weight, in the range 1 to 5.

As the metathesis activity of the ruthenium- or osmium-based catalyst used to prepare the hydrogenation catalyst composition according to this invention is not existing in the hydrogenation catalyst composition of the present invention the molecular weight of the hydrogenated nitrile rubber obtained after the hydrogenation is comparable to the original NBR feedstock and not further reduced during hydrogenation.

Hence, a hydrogenated nitrile rubber with a weight average molecular weight Mw in the range 2,000-500,000 g/mol, preferably in the range 20,000-400,000 g/mol is obtained. The Mooney viscosity (ML1+4 at 100° C.), measured in accordance with ASTM standard D 1646, of the hydrogenated nitrile rubbers is in the range from 1 to 150, preferably from 10 to 100. The polydispersity PDI=Mw/Mn, where Mw is the weight average molecular weight and Mn is the number average molecular weight, in the range 1 to 5 and preferably in the range 1.5 to 4.

For the purposes of the present invention, hydrogenation is a reaction of the double bonds present in the starting nitrile rubber to an extent of at least 50%, preferably 70-100%, more preferably 80-100%; even more preferably 90-100%

In the tandem method, the nitrile rubber is firstly degraded using at least one ruthenium- or osmium-based catalyst in the absence or in the presence of a co-olefin. The vinyl compound of general formula (1) is either added when the metathesis reaction has ceased or gone to completion or added before in order to stop the metathesis at a certain degree. Thereafter, the hydrogenation can be carried out to afford hydrogenated nitrile rubber by introducing hydrogen gas. In the sequence of metathesis, hydrogenation catalyst composition formation and hydrogenation, the metathesis degree can be fully controlled and the molecular weight of the final hydrogenated nitrile rubber is adjustable as desired. The nitrile rubbers subjected to metathesis in the tandem method may typically have a Mooney viscosity (ML1+4 at 100° C.), measured in accordance with ASTM standard D 1646, in the range from 30 to 75, and preferably from 30 to 50. The weight average molecular weight Mw is in the range 150,000-500,000 g/mol, preferably in the range 180,000-400,000 g/mol. These nitrile rubbers have a polydispersity PDI=Mw/Mn, where Mw is the weight average molecular weight and Mn is the number average molecular weight, in the range 2 to 6.

The invention is further illustrated but is not intended to be limited by the following examples in which all parts and percentages are by weight unless otherwise specified.

EXAMPLES

Catalysts Used in the Examples:

Catalysts (1) to (3) were purchased from Umicore AG & Co. KG.

Catalyst (1) "M41": [1,3-Bis(2,4,6-trimethylphenyl)-2-imidazolidinylidene]-[2-[[(4-methylphenyl)imino]methyl]-4-nitro-phenolyl]chloro-[3-phenyl-indenylidene]ruthenium (II); Molecular weight: 888.46 g/mol

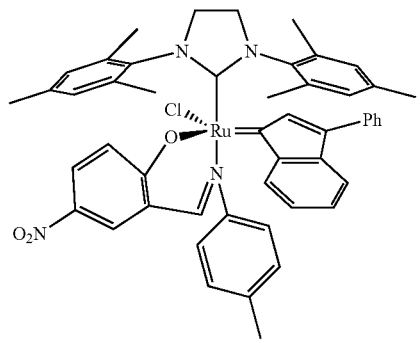

Catalyst (2) "M42": [1,3-Bis(2,4,6-trimethylphenyl)-2-imidazolidinylidene]-[2-[[(2-methylphenyl)imino]methyl]-phenolyl]-[3-phenyl-1H-inden-1-ylidene](chloro)ruthenium (II); Molecular weight: 843.47 g/mol

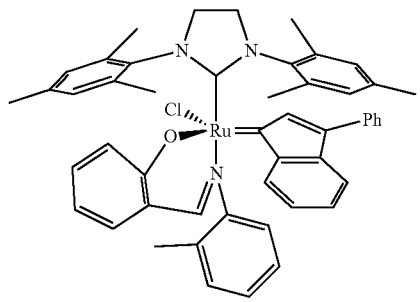

Catalyst (3) "Wilkinson Catalyst": Rhodium(I) tris(triphenylphosphine) chloride; Molecular weight: 925.22 g/mol

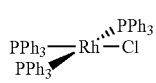

Nitrile Butadiene Rubber Used in the Examples:

The nitrile butadiene rubber used in the examples has the properties outlined in Table 1.

TABLE 1

| Nitrile Butadiene Rubber (NBR) used ("ACN" means acrylonitrile) | | | | |
|---|---|---|---|---|
| NBR | ACN content [% by weight] | Mooney viscosity ML(1 + 4) 100° C. [MU] | Mn [g/mol] | Mw [g/mol] | PDI |
| Perbunan ® 3431 F | 34 | 29 | 77,101 | 255,395 | 3.31 |

Ethyl vinyl ether (EVE) was purchased from Sigma-Aldrich.

Analytical Tests:

GPC Test: The apparent molecular weight Mn and Mw were determined by a Waters GPC system equipped with a Waters 1515 high performance liquid chromatography pump, a Waters 717plus autosampler, a PL gel 10 µm mixed B column and a Waters 2414 RI detector. The GPC test was carried out at 40° C. at 1 mL/min of flow rate with THF as the eluent, and the GPC column was calibrated with narrow PS standard samples.

FT-IR Test: The spectrum of nitrile rubber before, during and after the hydrogenation reaction was recorded on a Perkin Elmer spectrum 100 FT-IR spectrometer. The solution of the nitrile butadiene rubber in MCB was cast onto a KBr disk and dried to form a film for the test. The hydrogenation conversion is determined by the FT-IR analysis according to the ASTM D 5670-95 method.

Abbreviations:
phr: per hundred rubber (weight)
rpm: revolution per minute
Mn: number-average molecular weight
Mw: weight-average molecular weight
PDI: polydispersity index, defined as Mw/Mn
$PPh_3$: triphenylphosphine
MCB: monochlorobenzene
EVE: ethyl vinyl ether
RT: room temperature (22+/−2° C.)

Example 1*: (Comparison Example, Using Catalyst (1) without EVE Pretreatment)

Catalyst (1) (10.8 mg) was dissolved in 15 mL degassed MCB in a flask. A solution of 36 g Perbunan®3431 F in 247.5 g MCB (Perbunan®3431 F concentration of 15 wt. %) was bubbled with nitrogen in a 600 mL Parr autoclave for 30 minutes, and then heated to 138° C. The catalyst solution in the flask was transferred into the reactor via syringe. Hydrogenation was conducted under 8.27 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 85.0%. The final molecular weights and the PDI were: Mn=59,471 g/mol, Mw=178,552 g/mol, PDI=3.

Examples 2: (Inventive Example; Using Catalyst (1) with EVE as Co-Catalyst)

Catalyst (1) (10.8 mg) was dissolved in 15 g degassed MCB in a flask. Ethyl vinyl ether (0.375 mL) was injected into the flask and the solution was stirred for 12 hours at 20°

C. A solution of 36 g Perbunan® 3431 F in 247.5 g MCB (Perbunan® 3431 F concentration of 15 wt. %) was bubbled with nitrogen in a 600 mL Parr autoclave for 30 minutes, and then heated to 138° C. The catalyst solution in the flask was transferred into the reactor via syringe. Hydrogenation was conducted under 8.27 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 98.1%. The final molecular weights and the PDI were: Mn=64,283 g/mol, Mw=186,381 g/mol, PDI=2.9.

Examples 3: (Inventive Example; Using Catalyst (2) with EVE as Co-Catalyst)

Catalyst (2) (10.8 mg) was dissolved in 15 g degassed MCB in a flask. Ethyl vinyl ether (0.375 mL) was injected into the flask and the solution was stirred for 12 hours. A solution of 36 g Perbunan®3431 F in 247.5 g MCB (Perbunan®3431 F concentration of 15 wt. %) was bubbled with nitrogen in a 600 mL Parr autoclave for 30 minutes, and then heated to 138° C. The catalyst solution in the flask was transferred into the reactor via syringe. Hydrogenation was conducted under 8.27 MPa of hydrogen pressure and 800 rpm of agitation speed. Samples were taken from the reactor at intervals for FT-IR analysis to determine the hydrogenation degree. After 3 hours of hydrogenation, the hydrogenation degree reached 98.9%. The final molecular weights and the PDI were: Mn=57,556 g/mol, Mw=170,413 g/mol, PDI=2.95.

Example 4: (Inventive; Using Catalyst (1) with EVE as Co-Catalyst Added after Metathesis, Prior to the Hydrogenation Reaction)

Catalyst (1) (10.8 mg) was dissolved in 15 mL degassed MCB in a flask. A solution of 36 g Perbunan®3431 F in 247.5 g MCB (Perbunan®3431 F concentration of 15 wt. %) was bubbled with nitrogen in a 600 mL Parr autoclave for 30 minutes, and the catalyst solution in the flask was transferred into the reactor via syringe. After 30 minutes, EVE (0.375 mL) was injected and the solution stirred for 0.5 h. Afterwards, the reactor was heated to 138° C. Hydrogenation was conducted under 8.27 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 96.6%. The final molecular weights and the PDI were: Mn=63,095 g/mol, Mw=161,141 g/mol, PDI=2.76.

Example 5*: (Comparison Example; Using Catalyst (3))

A solution of 36 g Perbunan® 3431 F in 247.5 g MCB (Perbunan® 3431 F concentration of 15 wt. %) was bubbled with nitrogen in a 600 mL Parr autoclave for 30 minutes, and then heated to 138° C. Wilkinson's catalyst (21.6 mg) and PPh₃ (0.36 g) was dissolved in another 15 g of degassed MCB and then added into the reactor. Hydrogenation was conducted under 8.27 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 96.6%, the reactor was cooled to room temperature and the pressure was released.

TABLE 2

Examples 1 to 7 (for all examples: hydrogenation temperature: 138° C. and pressure: 8.27 MPa)

| | | Ex | | | | |
|---|---|---|---|---|---|---|
| | | 1* | 2 | 3 | 4 | 5* |
| NBR Perbunan® 3431 F | Amount [g] | 36 | 36 | 36 | 36 | 36 |
| MCB | Amount [g] | 247.5 + 15 | 247.5 + 15 | 247.5 + 15 | 247.5 + 15 | 247.5 + 15 |
| Catalyst | No. | (1) | (1) | (2) | (1) | (3) |
| | Amount [mg] | 10.8 | 10.8 | 10.8 | 10.8 | 21.6 |
| | [phr] | 0.03 | 0.03 | 0.03 | 0.03 | 0.06 |
| Co-catalyst | Type | — | EVE | EVE | EVE | PPh₃ |
| | Amount | — | 0.375 ml | 0.375 ml | 0.375 ml | 0.36 g |
| Co-catalyst to catalyst | Molar ratio | — | 321:1 | 307:1 | 321:1 | 59:1 |
| Pretreatment | Time [h] | 0 | 12 | 12 | 0.5 | 0 |
| Hydrogenation | Time [h] | 5 | 5 | 3 | 5 | 5 |
| | Degree [%] | 85.0 | 98.1 | 98.9 | 97.3 | 96.6 |
| HNBR | Mn [g/mol] | 59.471 | 64.283 | 57.556 | 63.095 | — |
| | Mw [g/mol] | 178.552 | 186.381 | 170.413 | 161.141 | — |
| | PDI | 3 | 2.9 | 2.95 | 2.76 | — |

*comparative examples

Inventive examples 2 and 3 show, that the hydrogenation degree after pretreatment with co-catalyst EVE is higher compared the comparative example 1 without pretreatment with co-catalyst EVE. The molecular weight of the HNBR and the PDI are within a comparable range.

Inventive example 4 was first treated with the catalyst (1) without pretreatment which leads to lowered molecular weight and lowered PDI. The reaction was stopped by addition of EVE and then, the NBR was hydrogenated with a higher degree than the comparative example 1.

Comparative example 5 shows the hydrogenation using a well known hydrogenation catalyst without metathesis activity for comparison. The inventive examples 2, 3 and 4 all show a higher hydrogenation degree after 5 hours than this standard Wilkinson hydrogenation catalyst.

What is claimed is:

1. A process for hydrogenating a nitrile rubber comprising:
   a) preparing a hydrogenation catalyst composition by contacting a complex hydrogenation catalyst of the general formula (IA) or (IB)

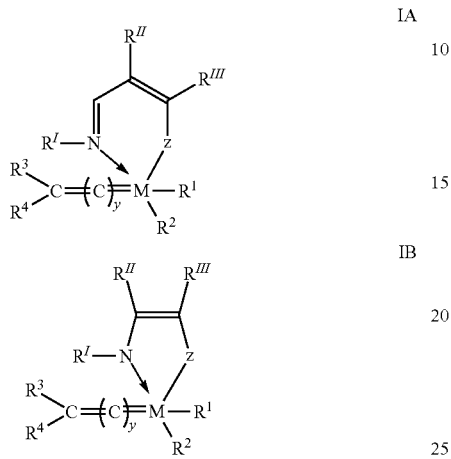

M is ruthenium;

z is selected from the group consisting of oxygen, sulphur, selenium, NR'''', PR'''', AsR'''' and SbR'''';

R'', R''' and R'''' are each a radical independently selected from the group consisting of hydrogen, $C_{1-6}$ alkyl, $C_{3-8}$ cycloalkyl, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, aryl and heteroaryl, or R'' and R''' together form an aryl or heteroaryl radical, each said radical (when different from hydrogen) being optionally substituted with one or more, preferably 1 to 3, substituents $R^5$ each independently selected from the group consisting of halogen atoms, $C_{1-6}$ alkyl, $C_{1-6}$ alkoxy, aryl, alkylsulfonate, arylsulfonate, alkylphosphonate, arylphosphonate, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, alkylammonium and arylammonium;

R' is either methyl, phenyl or substituted phenyl (e.g. dimethyl bromo phenyl or diisopropylphenyl) when included in a compound having the general formula (IA) or, is methylene or benzylidene when included in a compound having the general formula (IB);

$R^1$ is an electron donating complex ligand, which could be linked or not linked with $R^2$ to form a cyclic structure;

$R^2$ is an anionic ligand;

$R^3$ and $R^4$ are each hydrogen or a radical selected from the group consisting of $C_{1-20}$ alkyl, $C_{2-20}$ alkenyl, $C_{2-20}$ alkynyl, $C_{1-20}$ carboxylate, $C_{1-20}$ alkoxy, $C_{2-20}$ alkenyloxy, $C_{2-20}$ alkynyloxy, aryl, aryloxy, $C_{1-20}$ alkoxycarbonyl, $C_{1-8}$ alkylthio, $C_{1-20}$ alkylsulfonyl, $C_{1-20}$ alkylsulfinyl $C_{1-20}$ alkylsulfonate, arylsulfonate, $C_{1-20}$ alkylphosphonate, arylphosphonate, $C_{1-20}$ alkylammonium and arylammonium;

R' and one of $R^3$ and $R^4$ may be bonded to each other to form a bidentate ligand;

R''' and R'''' may be bonded to each other to form an aliphatic ring system including a heteroatom selected from the group consisting of nitrogen, phosphorous, arsenic and antimony;

$R^3$ and $R^4$ together may form a fused aromatic ring system having the formula (VI)

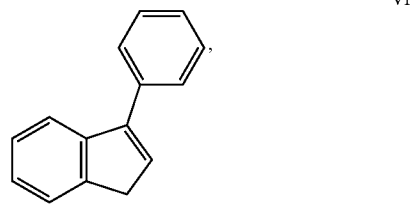

and y represents the number of $sp_2$ carbon atoms between M and the carbon atom bearing $R^3$ and $R^4$ and is 0 or 1, with at least one co-catalyst of the general formula (1) in a molar ratio of the complex hydrogenation catalyst to the co-catalyst in the range of 1:(20-550)

$$CH_2=CRR' \qquad (1)$$

in which R is hydrogen and R' represents $OR^1$ wherein $R^1$ shall mean $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl, $-C(=O)(R^2)$, $-C(=O)N(R^2)_2$, $-[(CH_2)_nO]_mR^2$, $-[(CH_2)_nO]_m-CH=CH_2$, or $-(CH_2)_p-C(R^3)_2R^4$, wherein $R^2$ are identical or different and represent H, $C_1$-$C_6$-alky, $C_5$-$C_8$-cycloalkyl, $C_2$-$C_8$-alkenyl, $C_2$-$C_8$-alkynyl, phenyl, imidazolyl, triazolyl, or pyridinyl, $R^3$ are identical or different and represent methyl, ethyl or $-(CH_2)_n-O-CH=CH_2$, $R^4$ represents $(CH_2)_p-O-CH=CH_2$, n is 1, or 2, m is 1, 2, or 3, and p is 0, 1, or 3, and thereafter b) hydrogenating the nitrile rubber with hydrogen in the presence of the catalyst composition formed in step a).

2. The process of claim 1 wherein:
the co-catalyst is selected from the group consisting of formulae (cocat-1) to (cocat-7) and (cocat-10) to (cocat-12)

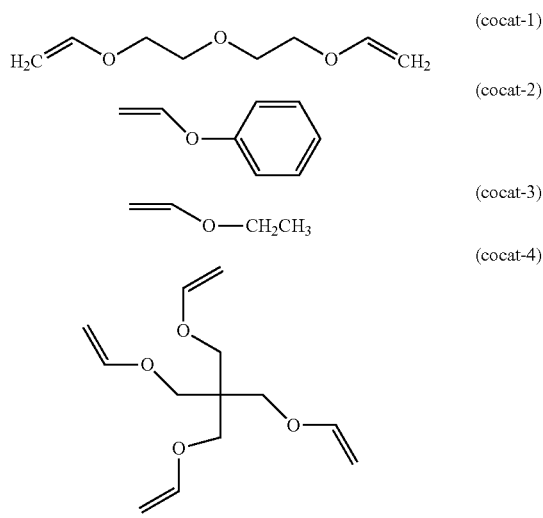

-continued

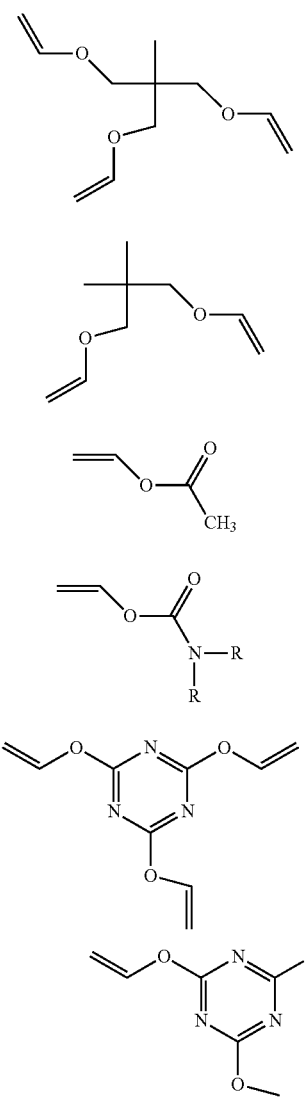

(cocat-5)

(cocat-6)

(cocat-7)

(cocat-10)

(cocat-11)

3. The process of claim 1 wherein the ligand $R^1$ of the complex hydrogenation catalyst has a structure corresponding to the general formulae (IIa) or (IIb),

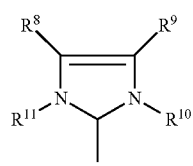

(IIa)

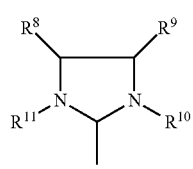

(IIb)

where $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

4. The process of claim 1, wherein $R^2$ is selected from the group consisting of hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

5. The process of claim 1 wherein y=0.

6. The process of claim 1, wherein $R^3$ and $R^4$ together form a fused aromatic ring system having the formula (VI)

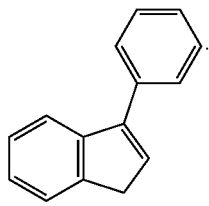

VI

7. The process of claim 1, wherein in step a)

(i) [1,3-Bis(2,4,6-trimethylphenyl)-2-imidazolidinylidene]-[2-[[(4-methylphenyl)imino]methyl]-4-nitro-phenolyl]chloro-[3-phenyl-indenylidene]ruthenium (II)

or (ii) [1,3-Bis(2,4,6-trimethylphenyl)-2-imidazolidinylidene]-[2-[[(2-methylphenyl)imino]methyl]-phenolyl]-[3-phenyl-1H-inden-1-ylidene](chloro)ruthenium(II)

is used as a complex hydrogenation catalyst.

8. The process of claim 1, wherein step a) is performed at a temperature in the range of from −20° C. to 160° C.

9. The process of claim 1, wherein the hydrogenation in step b) is carried out at a temperature in the range of from 60° C. to 200° C. and at a hydrogen pressure in the range of 0.5 MPa to 35 MPa.

10. The process according to of claim 1, wherein prior to step a), the nitrile rubber is subjected to a molecular weight degradation in a metathesis reaction first comprising contacting the nitrile rubber in the absence or presence of a co-olefin with the complex hydrogenation catalyst of the general formulae (IA) or (IB), and wherein in step a) the complex hydrogenation catalyst is present in the reaction mixture obtained after the metathesis reaction.

11. The process of claim 2 wherein the ligand $R^1$ of the complex hydrogenation catalyst has a structure corresponding to the general formulae (IIa) or (IIb),

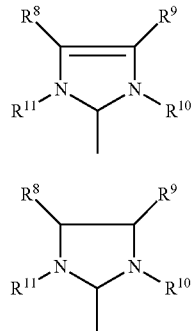

where
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

12. The process of claim 3, wherein $R^2$ is selected from the group consisting of hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

13. The process of claim 11, wherein $R^2$ is selected from the group consisting of hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

14. The process of claim 2 wherein y=0.
15. The process of claim 3 wherein y=0.
16. The process of claim 4 wherein y=0.
17. The process of claim 11 wherein y=0.
18. The process of claim 12 wherein y=0.

* * * * *